United States Patent Office 3,352,904
Patented Nov. 14, 1967

3,352,904
N-CARBOXYALKYL-(2-METHYLENEALKANOYL) ANILINE COMPOUNDS
John B. Bicking, Lansdale, and James M. Sprague, Gwynedd Valley, Pa., assignors to Merck & Co., Inc., Rahway, N.J., a corporation of New Jersey
No Drawing. Filed Feb. 28, 1964, Ser. No. 348,256
12 Claims. (Cl. 260—518)

ABSTRACT OF THE DISCLOSURE

N-carboxyalkyl-(2-methylenealkanoyl)anilines which may be substituted at the nitrogen atom by an alkyl or lower alkanoyl radical. The products are diuretic and saluretic agents which are useful in the treatment of conditions associated with edema.

The method for preparing the instant products consists in deaminating the Mannich amine precursors of the N-carboxyalkyl-(2-methylenealkanoyl)aniline products by treating the said Mannich bases with a weak base or by subjecting them to pyrolysis.

---

This invention relates to a new class of N-carboxyalkyl-(2-methylenealkanoyl)aniline compounds, the non-toxic, pharmacologically acceptable acid addition salts thereof and their amide derivatives.

The compounds of this invention exhibit highly valuable pharmacological properties which make them useful as diuretics. Thus, they are useful in the treatment of conditions resulting from an excessively high retention of fluid in the body or an excessively high concentration of electrolyte in the body, such as in the treatment of edematous conditions resulting, for example, from congestive heart failure.

The N - carboxyalkyl - (2 - methylenealkanoyl)aniline products of this invention relate to a compound having the following structure:

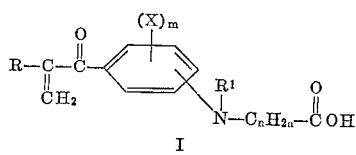

I wherein R is a member selected from the group consisting of lower alkyl, cycloalkyl, e.g., cycloalkyl radicals containing 5–6 nuclear carbon atoms, trihalomethyl-lower alkyl,

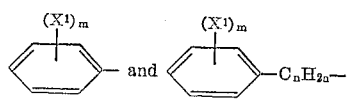

wherein $X^1$ represents a member selected from the group consisting of hydrogen, halogen, lower alkyl and lower alkoxy, $R^1$ represents a member selected from the group consisting of hydrogen, lower alkyl, and lower alkanoyl, X represents a member selected from the group consisting of hydrogen, halogen, lower alkyl and, taken together, two X radicals on adjacent carbon atoms of the benzene nucleus may be joined to form an hydrocarbylene chain (i.e., a divalent organic radical composed solely of carbon and hydrogen) containing four carbon atoms between their points of attachment, e.g., 1,3-butadienylene, i.e., —CH=CH—CH=CH—, etc., m, in each occurrence, is an integer having a value of 1–3 and n, in each occurrence, is an integer having a value of 1–5. Suitable groups illustrative of the radical R include, for example, methyl, ethyl, propyl, isopropyl, etc., cyclopentyl, cyclohexyl, 4-methylcyclohexyl, etc., 2,2,2-trifluoroethyl, 1-(trifluoromethyl)ethyl, etc., phenyl, 4-chlorophenyl, 4-tolyl, etc., benzyl, 4-chlorobenzyl, 4-methoxybenzyl, etc., $R^1$ groups include, for example, methyl, ethyl, propyl, etc., formyl, acetyl, etc. Radicals illustrative of the X substituents include, for example, chlorine, bromine, etc., methyl, ethyl, propyl, etc., methoxy, ethoxy, etc.

A preferred embodiment of the invention relates to a compound of the following formula:

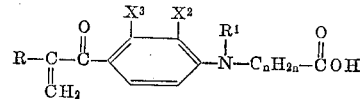

wherein the radical R represents lower alkyl, $R^1$ represents a member selected from the group consisting of hydrogen, lower alkyl and lower alkanoyl, $X^2$ and $X^3$ each represents similar or dissimilar radicals selected from the group consisting of hydrogen, halogen and lower alkyl and n represents an integer having a value of 1–2. The above-described class of compounds are particularly valuable diuretic agents and are thus highly useful in the treatment of conditions associated with electrolyte and fluid retention.

In addition to the N-carboxyalkyl-(2-methylenealkanoyl)aniline products described above this invention also relates to the acid addition salts of the instant carboxylic acids, which salts are prepared by the reaction of the said carboxylic acids with a base having a non-toxic, pharmacologically acceptable cation. In general, any base which will form an acid addition salt with a carboxylic acid and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocyclic amines, e.g., piperidine, etc. The acid addition salts thus produced are the functional equivalents of the corresponding N-carboxyalkyl-(2-methylenealkanoyl)aniline products and one skilled in the art will appreciate that to the extent that the carboxylic acids of the invention are useful in therapy, the variety of acid addition salts embraced by this invention are limited only by the criterion that the bases employed in forming the salts be both non-toxic and physiologically acceptable.

This invention also relates to the ester and amide derivatives of the N-carboxyalkyl-(2-methylenealkanoyl) aniline compounds, which derivatives are prepared by conventional methods well-known to those skilled in the art. Thus, for example, the ester derivatives may be prepared by the reaction of the carboxylic acid product of the invention with an alcohol as, for example, with a lower alkyl alcohol to prepare the corresponding esterified derivative or, alternatively, converting the carboxylic acid product to its acid halide by conventional methods and treating the acid halide thus formed with the appropriate lower alkanol. Similarly, the amide derivatives of the instant N-carboxyalkyl-(2-methylenealkanoyl) aniline products may be prepared by treating the acid halide of the instant acids with ammonia or an appropriate dialkylamine to produce the corresponding amide. Still another process for preparing the said amide derivatives comprises treating the ester derivatives described supra with ammonia or an appropriate dialkylamine to produce the corresponding amide. These and other equivalent methods for the preparation of the ester and amide derivatives of the instant N-carboxyalkyl-(2-methylenealkanoyl)aniline products will be apparent to one having ordinary skill in the art and to the extent that the said derivatives are both non-toxic and physiologically acceptable to the body system the said esters and amides are the functional equivalents of the corresponding carboxylic acid products.

The products of the invention are conveniently prepared by the deamination of a Mannich amine compound of the formula:

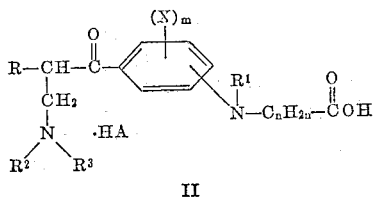

II wherein R, R¹, X, m and n are as defined above, R² and R³ each represents a member selected from the group consisting of lower alkyl and, taken together with the nitrogen atom to which they are attached, a mononuclear heterocyclic ring such as pyrrolidino, piperidino, morpholino, etc. and HA represents an organic or inorganic acid capable of forming salts with amines, e.g., hydrochloric acid, etc., by treating the said Mannich derivative with a weak base, e.g., an aqueous sodium bicarbonate solution. Acidification of the resulting reaction mixture as, for example, with a suitable organic or inorganic acid, such as hydrochloric acid, separates out the desired N-carboxyalkyl-(2-methylenealkanoyl)aniline compound.

The Mannich amine reagent (identified as compound II supra), wherein R¹ represents a lower alkyl or lower alkanoyl substituent, is synthesized by the condensation of an N-carboxyalkyl-lower alkanoyl substituted aniline, or lower alkyl ester thereof, with formaldehyde or paraformaldehyde and the acid addition salt of a secondary amine, for example, a di-lower alkylamine such as dimethylamine, or a mononuclear heterocyclic amine as, for example, a pyrrolidine, piperidine, morpholine, etc. When the starting material employed is the lower alkyl ester of N-carboxy-lower alkyl aniline, i.e., when R⁴ in the compound depicted as III infra represents a lower alkyl group, the corresponding esterified product (II) may, if desired, be hydrolyzed by conventional means to the desired acid. The following equation illustrates the reaction:

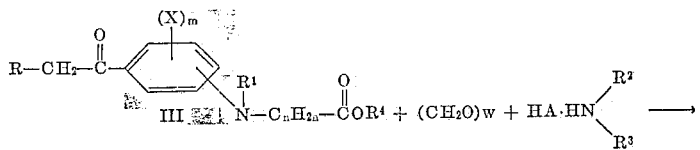

wherein the radicals R, R², R³, X, m and n are as defined above, R¹ represents a member selected from the group consisting of lower alkyl and lower alkanoyl, R⁴ represents a member selected from the group consisting of hydrogen and lower alkyl, e.g., methyl, ethyl, etc. and w represents an integer having a value of 1 or a number greater than 1 and HA represents an organic or inorganic acid capable of forming acid addition salts with amines, e.g., hydrochloric acid. The Mannich amine reagent (II) wherein R¹ represents hydrogen is prepared by the alternative reaction of an N-formyl-N-carboxyalkyl substituted aniline compound, i.e., a compound of the Formula III wherein the radical R¹ represents formyl, with formaldehyde or paraformaldehyde and the acid addition salt of a secondary amine, followed by the treatment of the Mannich amine thus produced with hydrochloric acid to split off the formyl group. The treatment of the Mannich amine with the said hydrochloric acid is conveniently conducted with slight heating as, for example, on the steam bath for a short interval.

The N-carboxyalkyl-nuclear alkanoyl substituted aniline compounds, depicted as intermediate III supra, are either known compounds or may be prepared by methods well-known to those having ordinary skill in the art. Thus, an N-lower alkanoyl substituted aniline, depicted as compound VI infra, may be reacted with a suitable alkanoyl halide of the formula:

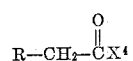

wherein the radical R is as described above and X⁴ represents halogen, e.g., chlorine, bromine, etc., in the presence of aluminum chloride to produce an N-alkanoyl-nuclear acylated aniline derivative (V), and the compound thus formed is hydrolyzed in aqueous hydrochloric acid solution to produce the corresponding nuclear acylated aniline intermediate (IV); which intermediate is then reacted with a suitable alkyl haloalkanoate, e.g., ethyl bromoalkanoate, in the presence of a base, such as anhydrous sodium carbonate, to yield the corresponding alkyl N-carboxyalkyl-nuclear alkanoyl substituted aniline compound (III). If desired, the said alkyl ester derivative (III) may be hydrolyzed to the corresponding carboxylic acid by treating the said ester (III) with an aqueous solution of sodium hydroxide. The following equation illustrates this method of preparation:

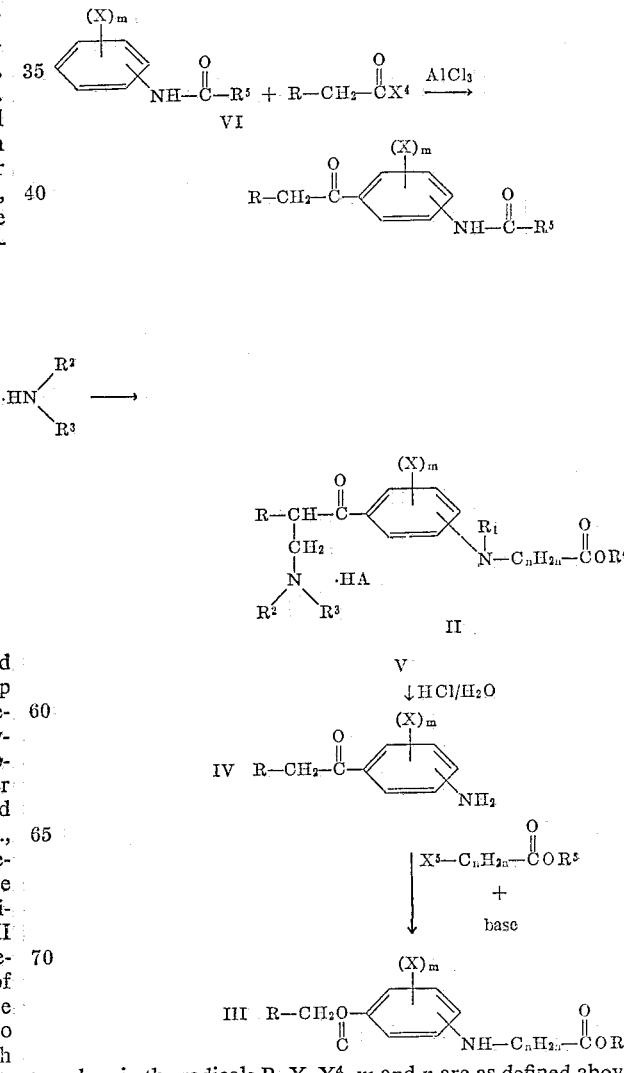

wherein the radicals R, X, X⁴, m and n are as defined above $R^5$ represents lower alkyl, e.g., methyl, ethyl, etc., and $X^5$ represents halogen, e.g., chlorine, bromine, etc. If desired, the N-lower alkyl and N-lower alkanoyl substituted derivatives of the N-carboxyalkyl-nuclear acylated aniline intermediate (III) may be prepared by treating the latter with a suitable alkylating agent, e.g., dimethyl sulfate, diethyl sulfate, etc., or an appropriate acylating agent, e.g., acetic anhydride, etc.

The N-carboxyalkyl - (2 - methylenealkanoyl)aniline products of this invention are generally obtained as solids and, if desired, may be purified by recrystallization from a suitable solvent, e.g., ethyl acetate or isopropyl alcohol.

The following examples are illustrative of the N-carboxyalkyl-(2-methylenealkanoyl)aniline products of the invention and the methods by which they may be prepared. The examples are illustrative only and the invention should not be construed as being limited thereto.

EXAMPLE 1

*N-(3-chloro-4-methacryloylphenyl)glycine*

STEP A.—2′-CHLORO-4′-AMINOPROPIOPHENONE 3-chloropropionanilide (172 g., 0.94 mole) is mixed with 504 g. (3.76 mole) of aluminum chloride. Propionyl chloride (175 g., 1.88 mole) is then added to the mixture with stirring over a 4 hour period and the mixture is stirred for 3 hours while heating on a steam bath. The mixture is then poured onto a mixture of ice and hydrochloric acid and the 3-chloro-4-propionylpropionanilide separates out by crystallization. This product is collected and hydrolyzed by heating with 900 ml. of 6 N hydrochloric acid for 1.5 hours on the steam bath and the solution thus obtained is made basic with a 40% sodium hydroxide solution. The product is collected and recrystallized from isopropyl alcohol to obtain 77 g. of 2′-chloro-4′-aminopropiophenone, M.P. 97–101° C.

An analytical sample of 2′-chloro-4′-aminopropiophenone gives a M.P. of 98–101° C.

*Analysis for* $C_9H_{10}ClNO$.—Calculated: C, 58.86; H, 5.49; N, 7.63. Found: C, 58.76; H, 5.38; N, 7.55.

STEP B.—ETHYL N-(3-CHLORO-4-PROPIONYLPHENYL) GLYCINATE

A mixture of 9.2 g. (0.05 mole) of 2′-chloro-4′-aminopropiophenone, 9.2 g. (0.055 mole) of ethyl bromoacetate, 10.6 g. (0.1 mole) of anhydrous sodium carbonate and 30 ml. of ethanol is refluxed for 18 hours. The inorganic salts are filtered off and the filtrate diluted with 50 ml. of water to precipitate the product, which is recrystallized twice from benzene to yield 6.7 g. of ethyl N-(3-chloro-4-propionylphenyl)glycinate, M.P. 80–81.5° C.

*Analysis for* $C_{13}H_{16}ClNO_3$.—Calculated: N, 5.19. Found: N, 5.13.

STEP C.—N-(3-CHLORO-4-PROPIONYLPHENYL) GLYCINE

A mixture of 27 g. (0.1 mole) of ethyl N-(3-chloro-4-propionylphenyl)glycinate and 250 ml. of 5% sodium hydroxide solution is stirred and heated for 20 minutes on the steam bath. The resulting clear solution is acidified with hydrochloric acid to precipitate 23.5 g. of N-(3-chloro-4-propionylphenyl)glycine, M.P. 141–143° C.

*Analysis for* $C_{11}H_{12}ClNO_3$.—Calculated: C, 54.66; H, 5.01; N, 5.80. Found: C, 54.67; H, 5.12; N, 5.73.

STEP D.—N-(3-CHLORO-4-PROPIONYLPHENYL)-N-FORMYLGLYCINE

A solution of 14.6 g. (0.06 mole) of N-(3-chloro-4-propionylphenyl)glycine in a mixture of 25 ml. of formic acid and 25 ml. of acetic anhydride is allowed to stand one hour and then evaporated to dryness in vacuo. The residue is recrystallized from benzene to obtain 12.5 g. of N - (3 - chloro-4-propionylphenyl) - N-formylglycine, M.P. 116–118° C.

*Analysis for* $C_{12}H_{12}ClNO_4$.—Calculated: C, 53.44; H, 4.49; N, 5.19. Found: C, 53.35; H, 4.60; N, 5.12.

STEP E.—N-[3-CHLORO-4-(2-DIMETHYLAMINOMETHYLPROPIONYL)PHENYL] - N - FORMYLGLYCINE HYDROCHLORIDE

A mixture of 8.1 g. (0.03 mole) of N-(3-chloro-4-propionylphenyl)-N-formylglycine, 1.35 g. (0.045 mole) of paraformaldehyde, 2.7 g. (0.033 mole) of dimethylamine hydrochloride and 4 drops of acetic acid is heated for 40 minutes on the steam bath. The melt is dissolved in 40 ml. of boiling isopropyl alcohol and the resulting solution is chilled to precipitate 4.1 g. of N-[3-chloro-4-(2 - dimethylaminomethylpropionyl)phenyl] - N-formylglycine hydrochloride, M.P. 144–148° C.

STEP F.—N-(3-CHLORO-4-METHACRYLOYLPHENYL) GLYCINE

N - [3 - chloro-4-(2-dimethylaminomethylpropionyl) phenyl]-N-formylglycine hydrochloride (4.0 g., 0.011 mole) is dissolved in 40 ml. of 5% hydrochloric acid solution and the solution heated for 5 minutes on the steam bath to produce N-[3-chloro-4-(2-dimethylaminomethylpropionyl)phenyl]glycine hydrochloride. Saturated sodium bicarbonate solution (160 ml.) is then added and heating continued for another 5-minute period. The solution is then cooled and acidified to precipitate a crystalline product which is then recrystallized from ethyl acetate to obtain 1.1 g. of N-(3-chloro-4-methacryloylphenyl)glycine, M.P. 145–147° C.

*Analysis for* $C_{12}H_{12}ClNO_3$.—Calculated: C, 56.81; H, 4.77; N, 5.52. Found: C, 56.82; H, 4.62; N, 5.46.

EXAMPLE 2

*N-(3-chloro-4-methacryloylphenyl)sarcosine*

STEP A.—N-(3-CHLORO-4-PROPIONYLPHENYL) SARCOSINE

A mixture of 8.1 g. (0.03 mole) of ethyl N-(3-chloro-4-propionylphenyl)glycinate, prepared as described in Example 1, Step B, 5.1 g. (0.04 mole) of dimethyl sulfate, 6.4 g. (0.06 mole) of sodium carbonate and 35 ml. of benzene is refluxed for 24 hours, cooled and extracted with water. The benzene solution is then evaporated in vacuo, the residual oil is dissolved in a mixture of 50 ml. of 10% sodium hydroxide solution and 30 ml. of ethanol and the solution refluxed for 10 minutes. Water (200 ml.) is added and the solution acidified with hydrochloric acid to precipitate the product, which is recrystallized from aqueous isopropyl alcohol to obtain 4.0 g. of N-(3-chloro-4-propionylphenyl)sarcosine, M.P. 121–123° C.

*Analysis for* $C_{12}H_{14}ClNO_3$.—Calculated: C, 56.36; H, 5.52; N, 5.48. Found: C, 55.98; H, 5.57; N, 5.44.

STEP B.—N-[3-CHLORO-4-(2-DIMETHYLAMINOMETHYLPROPIONYL)-PHENYL]SARCOSINE HYDROCHLORIDE

A mixture of 9.0 g. (0.035 mole) of N-(3-chloro-4-propionylphenyl)sarcosine, 1.5 g. (0.05 mole) of paraformaldehyde, 3.3 g. (0.04 mole) of dimethylamine hydrochloride and 0.5 ml. of acetic acid is heated for 1 hour on the steam bath. The melt is dissolved in 40 ml. of boiling isopropyl alcohol and the resulting solution is then chilled to precipitate 8.0 g. of N-[3-chloro-4-(2-dimethylaminomethylpropionyl)phenyl]sarcosine hydrochloride, M.P. 144–152° C.

STEP C.—N-(3-CHLORO-4-METHACRYLOYLPHENYL) SARCOSINE

A solution of 10 g. (0.0285 mole) of N-[3-chloro-4-(2 - dimethylaminomethylpropionyl)phenyl]sarcosine hydrochloride in 70 ml. of saturated sodium bicarbonate solution is heated for 5 minutes on the steam bath. The solution is then cooled and acidified with hydrochloric acid. The product which precipitates is recrystallized twice from ethyl acetate to obtain 1.1 g. of N-(3-chloro-4-methacryloylphenyl)sarcosine, M.P. 118–119° C.

*Analysis for* $C_{13}H_{14}ClNO_3$.—Calculated: C, 58.25; H, 5.27; N, 5.23. Found: C, 57.99; H, 5.36; N, 5.19.

EXAMPLE 3

N-(3-chloro-4-methacryloylphenyl)-N-acetylglycine

STEP A.—N-(3-CHLORO-4-PROPIONYLPHENYL)-N-ACETYLGLYCINE

A solution of 72.5 g. (0.27 mole) of ethyl N-(3-chloro-4-propionylphenyl)glycinate, prepared by the method described in Example 1, Step B, in 91 g. (0.9 mole) of acetic anhydride is heated for 16 hours on the steam bath. The solution is evaporated to dryness in vacuo and the residue is hydrolyzed by heating for 3 minutes on the steam bath in a boiling mixture of 300 ml. of 10% sodium hydroxide solution and 100 ml. of ethanol. The solution is acidified with hydrochloric acid to precipitate the product and then recrystallized from aqueous isopropyl alcohol to obtain 35.5 g. of N-(3-chloro-4-propionylphenyl)-N-acetylglycine, M.P. 151–153° C.

Analysis for $C_{13}H_{14}ClNO_4$.—Calculated: N, 4.94. Found: N, 4.87.

STEP B.—N-(3-CHLORO-4-METHACRYLOYLPHENYL)-N-ACETYLGLYCINE

A mixture of 5.7 g. (0.02 mole) of N-(3-chloro-4-propionylphenyl)-N-acetylglycine, 0.84 g. (0.028 mole) of paraformaldehyde, 1.8 g. (0.022 mole) of dimethylamine hydrochloride and 1 ml. of acetic acid is heated for 1 hour at 110° C. The compound N-[3-chloro-4-(2-dimethylaminomethylpropionyl)phenyl] - N-acetylglycine hydrochloride forms and spontaneously decomposes during the heating period to a melt comprising the compound N - (3 - chloro-4-methacryloylphenyl)-N-acetylglycine. The melt is dissolved in boiling aqueous isopropyl alcohol and the resulting solution is then chilled to precipitate the product. The product is recrystallized from isopropyl alcohol to yield 1.8 g. of N-(3-chloro-4-methacryloylphenyl)-N-acetylglycine, M.P. 176.5–179° C.

Analysis for $C_{14}H_{14}ClNO_4$.—Calculated: C, 56.86; H, 4.77; N, 4.74. Found: C, 56.95; H, 4.83; N, 4.67.

EXAMPLE 4

N-(4-methacryloylphenyl)-N-acetylglycine

STEP A.—ETHYL N-(4-PROPIONYLPHENYL)GLYCINATE

A mixture of 44.6 g. (0.3 mole) of 4'-aminopropiophenone, 55 g. (0.33 mole) of ethyl bromoacetate, 53 g. (0.5 mole) of sodium carbonate and 180 ml. of ethanol are refluxed for 17 hours. The solution is cooled and to the mixture is added 750 ml. of water. The product which separates is recrystallized from a mixture of benzene-cyclohexane to obtain 59.5 g. of ethyl N-(4-propionylphenyl)glycinate, M.P. 74–78° C.

An analytical sample gives a melting point of 77–78.5° C.

Analysis for $C_{13}H_{17}NO_3$.—Calculated: C, 66.36; H, 7.28; N, 5.95. Found: C, 66.31; H, 7.00; N, 5.88.

STEP B.—N-(4-PROPIONYLPHENYL)-N-ACETYLGLYCINE

A solution of 52 g. (0.22 mole) of ethyl N-(4-propionylphenyl)glycinate in 61.2 g. (0.6 mole) of acetic anhydride is heated for 17 hours on the steam bath and then chilled. The product which separates is collected and added to a boiling mixture of 200 ml. of 10% sodium hydroxide solution and 120 ml. of ethanol. After 3 minutes the solution is cooled, diluted with water and acidified with hydrochloric acid to precipitate N-(4-propionylphenyl)-N-acetylglycine, which is then recrystallized from aqueous isopropyl alcohol to obtain 35.0 g. of N-(4-propionylphenyl)-N-acetylglycine, M.P. 211–213° C.

STEP C.—N-(4-METHACRYLOYLPHENYL)-N-ACETYLGLYCINE

A mixture of 12.5 g. (0.05 mole) of N-(4-propionylphenyl)-N-acetylglycine, 2.1 g. (0.07 mole) of paraformaldehyde, 4.5 g. (0.055 mole) of dimethylamine hydrochloride and 1 ml. of acetic acid is heated for ½ hour at 115–125° C. to produce the compound N-[4-(2-dimethylaminoethylpropionyl)phenyl]-N-acetylglycine hydrochloride. Water (120 ml.) is added and insoluble material is filtered off. To the solution is added 7.5 g. of sodium bicarbonate, and the basic solution is heated for 17 minutes on the steam bath. Acidification with hydrochloric acid precipitates the product, which is recrystallized from aqueous isopropyl alcohol to yield 1.9 g. of N-(4-methacryloylphenyl)-N-acetylglycine, M.P. 205–207° C.

Analysis for $C_{14}H_{15}NO_4$.—Calculated: C, 64.36; H, 5.79; N, 5.36. Found: C, 64.45; H, 5.93; N, 5.31.

EXAMPLE 5

N-[2,3-dimethyl-4-(2-methylenebutyryl)phenyl]glycine

STEP A.—2',3'-DIMETHYL-4'-AMINOBUTYROPHENONE

Butyryl chloride (18 g., 0.168 mole) is added dropwise during one hour to a stirred mixture of 13.7 g. (0.084 mole) of N-acetyl-2,3-dimethylaniline and 45 g. (0.336 mole) of aluminum chloride. The mixture is heated and stirred 3 hours on the steam bath, then cooled and poured into a mixture of ice and hydrochloric acid. The product, 2',3' - dimethyl - 4'-acetamidobutyrophenone, is taken up in benzene; the benzene is evaporated, 90 ml. of 6 N hydrochloric acid is added, and the mixture heated with stirring on the steam bath for 1.5 hours to effect hydrolysis. Basification of the resulting mixture with a 40% sodium hydroxide solution precipitates the crystalline amine, which is repeatedly recrystallized from cyclohexanebenzene to obtain 3.8 g. of 2',3'-dimethyl-4'-aminobutyrophenone, M.P. 74–77.5° C.

Analysis for $C_{12}H_{17}NO$.—Calculated: N, 7.32. Found: N, 7.24.

STEP B.—ETHYL N-(2,3-DIMETHYL-4-BUTYRYLPHENYL)GLYCINATE

A mixture of 19.1 g. (0.1 mole) of 2',3'-dimethyl-4'-aminobutyrophenone, 18.3 g. (0.11 mole) of ethyl bromoacetate, 21.2 g. (0.2 mole) of sodium carbonate and 50 ml. of ethanol is heated under reflux for 3 hours. The mixture is then chilled. The solid is collected, washed thoroughly with water and then with dilute hydrochloric acid. There is thus obtained 17 g. of ethyl N-(2,3-dimethyl-4-butyrylphenyl)glycinate, M.P. 83–86° C. Recrystallization from ethanol affords the pure product, M.P. 84–86° C.

Analysis for $C_{16}H_{23}NO_3$.—Calculated: N, 5.05. Found: N, 4.97.

STEP C.—N-(2,3-DIMETHYL-4-BUTYRYLPHENYL)GLYCINE

Ethyl N-(2,3-dimethyl-4-butyrylphenyl)glycinate (49.8 g., 0.18 mole) is stirred and heated 0.5 hour on the steam bath with 1.0 l. of 5% sodium hydroxide solution. The resulting solution is cooled and acidified with hydrochloric acid to precipitate the product, which is then purified by being redissolved in dilute sodium hydroxide solution and reprecipitated with hydrochloric acid. There is thus obtained 44.5 g. of N-(2,3-dimethyl-4-butyrylphenyl)glycine, M.P. 148–151° C.

Analysis for $C_{14}H_{19}NO_3$.—Calculated: N, 5.62. Found: N, 5.52.

STEP D.—N-[2,3-DIMETHYL - 4 - (2 - DIMETHYLAMINOMETHYLBUTYRYL)PHENYL]GLYCINE HYDROCHLORIDE

A mixture of 21.1 g. (0.085 mole) of N-(2,3-dimethyl-4-butyrylphenyl)glycine, 3.8 g. (0.127 mole) of paraformaldehyde, 7.6 g. (0.093 mole) of dimethylamine hydrochloride and 1.5 ml. of acetic acid is heated one hour on the steam bath. The resulting pasty mass is stirred with 150 ml. of boiling isopropyl alcohol. The mixture is cooled and the product is collected. There is thus obtained 10 g.

of N-[2,3-dimethyl - 4 - (2-dimethylaminomethylbutyryl) phenyl]glycine hydrochloride, M.P. 191.5–195.5° C.

*Analysis* for $C_{17}H_{26}N_2O_3 \cdot HCl$.—Calculated: C, 59.55; H, 7.94; N, 8.17. Found: C, 59.61; H, 7.95; N, 8.27.

STEP E.—N-[2,3-DIMETHYL-4-(2-METHYLENE-BUTYRYL)PHENYL]GLYCINE

A solution of 5.5 g. (0.016 mole) of N-[2,3-dimethyl-4-(2-dimethylaminomethylbutyryl)phenyl]glycine hydrochloride in 100 ml. of saturated sodium bicarbonate solution is allowed to stand 5 days at room temperature. Acidification with hydrochloric acid precipitates 1.8 g. of the product, M.P. 100–105° C. Recrystallization from cyclohexane-benzene yields pure N-[2,3-dimethyl-4-(2-methylenebutyryl)phenyl]glycine, M.P. 103–106° C.

*Analysis* for $C_{15}H_{19}NO_3$.—Calculated: C, 68.94; H, 7.33; N, 5.36. Found: C, 68.92; H, 7.57; N, 5.27.

By substituting the appropriate N-carboxyalkyl-4-(2-sec.-aminomethylalkanoyl)aniline hydrochloride reactant (II) for the N-[3-chloro-4-(2-dimethylaminomethylpropionyl)phenyl]sarcosine hydrochloride of Example 2, Step C, and following substantially the procedure described therein, the corresponding N-carboxyalkyl-(2-methylenealkanoyl)aniline products are prepared. The following equation and accompanying table depict the reaction described in the foregoing example and illustrate the starting materials and final products produced thereby:

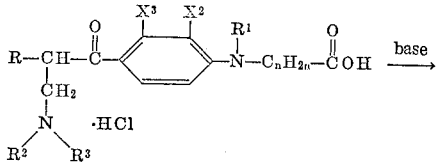

II

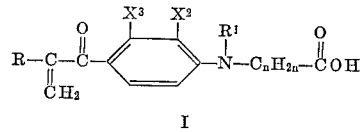

I

It is apparent from the foregoing description that the N - carboxyalkyl - (2 - methylenealkanoyl)aniline compounds of the present invention constitute a very valuable class of compounds which has not been prepared heretofore. One skilled in the art will also appreciate that the processes disclosed in the above examples are merely illustrative and are capable of wide variation and modification without departing from the spirit of this invention.

What is claimed is:

1. A compound of the formula:

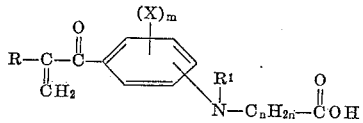

wherein R represents a member selected from the group consisting of lower alkyl, cycloalkyl, trifluoromethyl substituted lower alkyl,

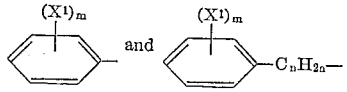

wherein the radical $X^1$ is a member selected from the group consisting of hydrogen, halogen, lower alkyl and lower alkoxy, $R^1$ is a member selected from the group consisting of hydrogen, lower alkyl and lower alkanoyl, X is a member selected from the group consisting of hydrogen, halogen, lower alkyl and, taken together, two X radicals on adjacent carbon atoms of the benzene ring may be combined to form an hydrocarbylene chain containing four carbon atoms between their points of attachment, m, in each occurrence, is an integer having a value of 1–3 and n, in each occurrence, is an integer having a value of 1–5.

2. A compound of the formula:

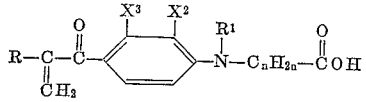

TABLE I

| Example | R | $R^1$ | $R^2$ | $R^3$ | $X^2$ | $X^3$ | $-C_nH_{2n}-$ |
|---|---|---|---|---|---|---|---|
| 6 | $-CH_3$ | $-CHO$ | $-CH_3$ | $-CH_3$ | H | Cl | $-CH_2-$ |
| 7 | $-C_2H_5$ | H | $-CH_3$ | $-CH_3$ | H | Cl | $-CH_2-$ |
| 8 | $-C_2H_5$ | H | $-CH_3$ | $-CH_3$ | Cl | Cl | $-CH_2-$ |
| 9 | $-CH_3$ | H | $-CH_3$ | $-CH_3$ | H | Cl | $-\underset{CH_3}{CH}-$ |
| 10 | $-C_2H_5$ | H | $-CH_3$ | $-CH_3$ | $-CH=CH-$ | $CH=CH-$ | $-CH_2-$ |
| 11 | $-\underset{CH_3}{CH}-CH_3$ | H | $-C_2H_5$ | $-C_2H_5$ | H | Cl | $-CH_2$ |
| 12 | $-\underset{CH_3}{CH}-CH_3$ | H | $-(CH_2)_5-$ | | Cl | Cl | $-CH_2-$ |
| 13 | $-CH_2-CF_3$ | H | $-CH_3$ | $-CH_3$ | $-CH_3$ | $-CH_3$ | $-CH_2-$ |
| 14 | $-\underset{CF_3}{CH}-CH_3$ | H | $-CH_3$ | $-CH_3$ | H | $-CH_3$ | $-CH_2-$ |
| 15 | $-C_2H_5$ | H | $-C_2H_5$ | $-C_2H_5$ | Cl | $-CH_3$ | $-CH_2-$ |
| 16 | $-C_2H_5$ | H | $-(CH_2)_4-$ | | $-CH_3$ | Cl | $-CH_2-$ |
| 17 | $-\phi$ | H | $-CH_3$ | $-CH_3$ | H | Cl | $-\underset{CH_3}{CH}-$ |
| 18 | $-CH_2-\phi$ | $-CH_3$ | $-CH_3$ | $-CH_3$ | H | Cl | $-CH_2-$ |
| 19 | $-CH\underset{CH_2-CH_2}{\overset{CH_2-CH_2}{<}}CH_2$ | H | $-CH_3$ | $-CH_3$ | H | Cl | $-CH_2$ | wherein R represents lower alkyl, $R^1$ is a member selected from the group consisting of hydrogen, lower alkyl and lower alkanoyl, $X^2$ and $X^3$ each represents similar or dissimilar radicals selected from the group consisting of hydrogen, halogen and lower alkyl and $n$ is an integer having a value of 1–2.

3. A compound of the formula:

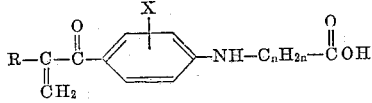

wherein R is lower alkyl, X is halogen and $n$ is an integer having a value of 1–2.

4. A compound of the formula:

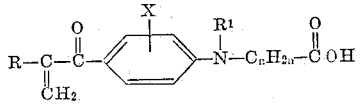

wherein R is lower alkyl, $R^1$ is lower alkyl, X is halogen and $n$ is an integer having a value of 1–2.

5. A compound of the formula:

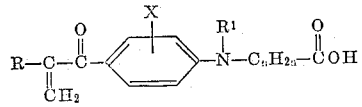

wherein R is lower alkyl, $R^1$ is lower alkanoyl, X is halogen and $n$ is an integer having a value of 1–2.

6. A compound of the formula:

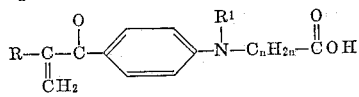

wherein R is lower alkyl, $R^1$ is lower alkanoyl and $n$ is an integer having a value of 1–2.

7. A compound of the formula:

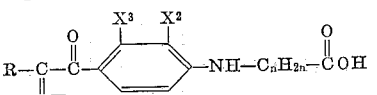

wherein R is lower alkyl, $X^2$ and $X^3$ represent lower alkyl and $n$ is an integer having a value of 1–2.

8. N-(3-chloro-4-methacryloylphenyl)glycine.
9. N-(3-chloro-4-methacryloylphenyl)sarcosine.
10. N-(3-chloro - 4 - methacryloylphenyl) - N - acetylglycine.
11. N-(4-methacryloylphenyl)-N-acetylglycine.
12. N-[2,3-dimethyl - 4 - (2-methylenebutyryl)phenyl]glycine.

References Cited

UNITED STATES PATENTS 3,255,242   6/1966   Bolhofer et al. _____ 260—519

OTHER REFERENCES

Advanced Organic Chemistry, E. E. Royals, 1961, Prentice-Hall, Inc., page 789 relied on.

LORRAINE A. WEINBERGER, *Primary Examiner.*

L. A. THAXTON, *Assistant Examiner.*